L. J. WORDEN.
Casting Bottoms on Sheet Metal Ware.
No. 1,896. Reissued Feb. 28, 1865.
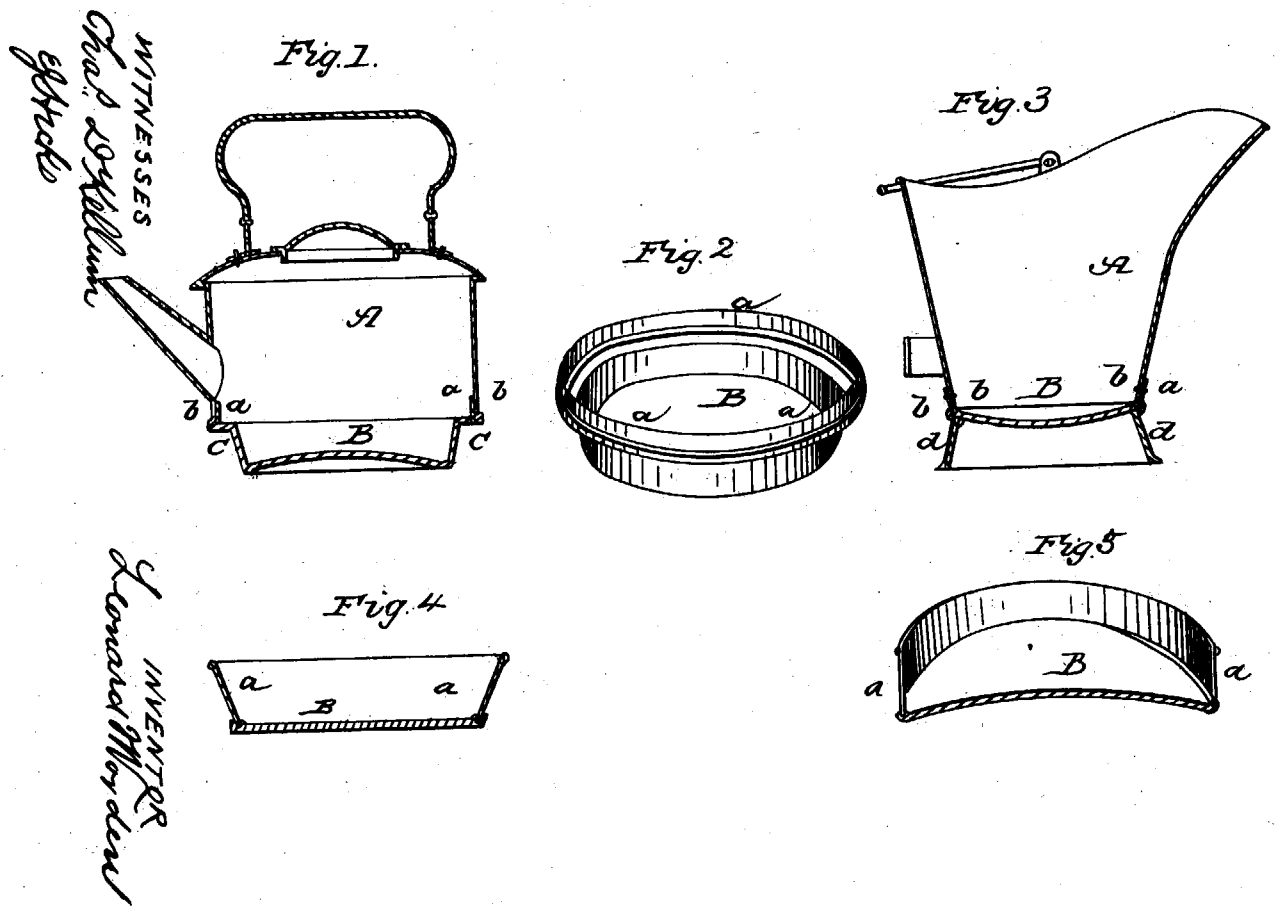
WITNESSES
Chas. D. Kellum
E. J. Hicks
INVENTOR
Leonard Worden
N. PETERS, Photo-Lithographer, Washington, D. C.

UNITED STATES PATENT OFFICE.

LEONARD J. WORDEN, OF UTICA, ASSIGNOR TO HIMSELF, AND HICKS, WOLFE & CO., OF TROY, NEW YORK.

CASTING BOTTOMS ON SHEET-METAL WARE.

Specification forming part of Letters Patent No. 38,780, dated June 2, 1863; Reissue No. 1,896, dated February 28, 1865.

*To all whom it may concern:*

Be it known that I, LEONARD J. WORDEN, of the city of Utica, county of Oneida, and State of New York, have invented a new and improved mode of securing cast-iron bottoms to sheet metal vessels—such as tea-kettles, pans, coal-hods, and other vessels for kitchen use—as well as in their construction; and I do hereby declare that the following is a full, clear, and exact description thereof, reference being hereby had to the accompanying drawings, and to the letters of reference marked thereon, which said drawings make a part of this specification.

Like letters represent and refer to like or corresponding parts.

Figure 1 is a vertical section of a tea-kettle and the invention and improvement herein described as applied to tea-kettles. Fig. 2 is a perspective and sectional view of a cast-iron bottom as applied to sheet metal in the manner herein described and set forth. Fig. 3 is a vertical section of a coal-hod, and showing my said invention and improvement applied thereto in the manner substantially as herein described and set forth, and Fig. 4 shows the said invention as applied to pans for baking purposes.

The nature of my said improvement consists in the employment of cast-iron bottoms for tea-kettles, coal-hods, wash-boilers, pans, and other articles of ware for kitchen use, and the mode or manner herein described for firmly securing such bottoms to the sheet-metal part of such vessels, by means of which a more durable and economical article is secured to the market for sale and for use.

To enable others skilled in the art to which my said invention and improvement relates to make and use the same, I will here proceed to describe the same, as well as the mode or manner of the construction thereof, which is as follows, to wit:

B is the cast-iron bottom, which may be of any size, shape, or thickness desired. A is the sheet-metal part or cylinder of a tea-kettle and coal-hod with cast-iron bottom attached thereto or combined therewith in the manner herein described and set forth. *a* is a narrow rim or band of sheet metal, upon the lower edge of which is the bottom cast thereon. The said edge may extend down into the cast-iron part to any distance required. It is placed in the sand as a part of the pattern. When that part of the pattern which is to form the cast-iron part is removed, a part of said rim or band remains exposed, so as to receive the molten iron and become united thereto and therewith in a raised projection and entirely around the lower edge of the said band, so as to form a perfect water-tight joint. The upper edge will then project upward sufficiently to receive the cylinder part of the vessel A, which is placed over and outside of the said band or rim *a*, and thus and there firmly connected together by means of solder on the inside, with or without a seam. In the case of the coal-hod the said cylinder A may be firmly secured to the said rim or band *a* by means of rivets. If preferred, the said cast-iron bottom may be cast to, upon, and around the lower edge of the cylinder forming the body of the vessel, as shown at Figs. 4 and 5, thereby forming the vessel without the use of solder or rivets. The said band or rim *a* would then of course form the cylinder part of the vessel desired. Any kind of sheet metal may be used for the said rim or cylinder. The said bottom unites with the said band, rim, or cylinder during the process of casting.

Having thus described my invention and improvements, what I claim, and desire to secure by Letters Patent, is—

The employment of cast-iron bottoms in the manufacture of tea-kettles, wash-boilers, coal-hods, pans, and other articles for kitchen use, united to and combined with the cylinder or body thereof, in the manner and by the means substantially as herein described and set forth.

In testimony whereof I have hereunto set my hand this 2d day of March, 1864.

LEONARD J. WORDEN.

Witnesses:

CHAS. D. KELLUM,

MARCUS P. NORTON.